United States Patent

Smout et al.

[11] Patent Number: 5,912,199
[45] Date of Patent: Jun. 15, 1999

[54] UV RADIATION-ABSORBING PACKING

[75] Inventors: Adrianus Smout, Essen, Belgium; Gerrit Jan Loggers, Heemstede, Netherlands

[73] Assignee: Heineken Technical Services B.V., Amsterdam, Netherlands

[21] Appl. No.: 08/836,330

[22] PCT Filed: Nov. 13, 1995

[86] PCT No.: PCT/NL95/00389

§ 371 Date: Aug. 18, 1997

§ 102(e) Date: Aug. 18, 1997

[87] PCT Pub. No.: WO96/15074

PCT Pub. Date: May 23, 1996

[30] Foreign Application Priority Data

Nov. 11, 1994 [NL] Netherlands ............................ 9401891
May 18, 1995 [NL] Netherlands ............................ 1000397

[51] Int. Cl.$^6$ .................................................. C03C 3/087
[52] U.S. Cl. .............................. 501/70; 501/905; 215/400
[58] Field of Search ................... 501/70, 905, 71; 215/400

[56] References Cited

U.S. PATENT DOCUMENTS

| | | | |
|---|---|---|---|
| 2,524,719 | 10/1950 | Tillyer ........................................ | 501/71 |
| 2,892,726 | 6/1959 | Smith et al. . | |
| 4,253,878 | 3/1981 | Weaver et al. ............................ | 501/71 |
| 4,312,953 | 1/1982 | Mills ........................................ | 501/71 |
| 5,240,886 | 8/1993 | Gulotta et al. ............................ | 501/70 |
| 5,256,607 | 10/1993 | Kerko et al. . | |
| 5,352,640 | 10/1994 | Combes et al. ........................... | 501/71 |
| 5,385,872 | 1/1995 | Gulotta et al. ............................ | 501/71 |
| 5,403,789 | 4/1995 | Kerko et al. .............................. | 501/71 |
| 5,411,922 | 5/1995 | Jones ........................................ | 501/70 |
| 5,593,929 | 1/1997 | Krumwiede et al. ..................... | 501/70 |
| 5,641,716 | 6/1997 | Highby et al. ............................ | 501/70 |
| 5,650,365 | 7/1997 | Highby et al. ............................ | 501/70 |
| 5,700,579 | 12/1997 | Jeanvoine et al. ........................ | 501/70 |
| 5,780,372 | 7/1998 | Highby ..................................... | 501/70 |

FOREIGN PATENT DOCUMENTS 0 469 446A1 2/1992 European Pat. Off. .
82 03386 10/1982 WIPO .

OTHER PUBLICATIONS

Chemical Abstracts, vol. 88, No. 24, Jun. 12, 1978, Columbus, Ohio, US; abstract No. 175980p, S. Kitao et al. 'IR and UV Absorbing Glasses' p. 356; column R & JP,B.77 103 311 (Toyo Glass Co., Ltd.) Aug. 27, 1977.

Glass Technology, vol. 26, No. 01, Feb. 1, 1985, pp. 60–62, Cerchez et al. "The Effects of Iron on UV Porection . . . Green Glasses".

Patent Abstracts of Japan, vol. 13 No. 262 (C–608), Jun. 16, 1989 & JP,A,01 065044 (Kamaya) Mar. 10, 1989.

*Primary Examiner*—Karl Group
*Attorney, Agent, or Firm*—Pearne, Gordon, McCoy & Granger LLP

[57] ABSTRACT

The invention relates to a packing for foods on the basis of green colored soda-lime glass absorbing UV radiation and transmitting visible light, which glass consists of: at least 2.5 wt. % iron, calculated as $Fe_2O_3$, at least 12 wt. % sodium, calculated as $Na_2O$, and at most 4 wt. % aluminum, calculated as $Al_2O_3$.

19 Claims, No Drawings

UV RADIATION-ABSORBING PACKING

The invention relates to a packing for foods sensitive to UV radiation. More in particular, the invention relates to a packing made of green glass absorbing UV radiation, e.g. a bottle for packing foods and beverages made of green glass absorbing UV radiation and largely transmitting visible light. This means that efforts are directed to obtaining a type of glass largely transmitting visible light and having a green color. The latter means that the dominant wavelength of the glass is in the vicinity of 500 to 565 nm.

As is known, UV radiation, more in particular radiation having a wavelength less than about 400 nm, has a negative effect on the odor and the flavor of foods and beverages, such as beer. This negative effect is ascribed to the chemical reaction of components under the influence of UV radiation.

It has long since been known that it is possible to reduce UV radiation by using glass provided with a number of additions, mostly metal compounds. Until recently UV radiation-absorbing green glass, to which the present invention relates, was chiefly obtained by incorporating chromium compounds in the glass. EP-A 261 725 describes the manufacture of green UV radiation-absorbing soda-lime glass with an amount of chromium compounds which may be partially replaced by nickel Compounds, if required. The use of especially chromium compounds, like of nickel compounds, is increasingly felt to be less desirable, both from the viewpoint of costs and from the viewpoint of environmental effects of the metal compounds.

Japanese patent application JP-A 1/65044 describes the use of iron-containing lava as addition to soda-lime glass to obtain glass having a dark green color. However, by adding the lava the composition of the glass batch is changed in such a manner that the processability deteriorates while the color tends towards very dark green to nearly black.

From the literature it is already known that green-colored glass having absorption capacity for IR and TV radiation can be obtained by incorporating iron compounds in glass. This often concerns the manufacture of glass used for windows, e.g. heat- and light-resistant car windows. In general, it involves a slight reduction of the transmission of the radiation by incorporating a minor amount of iron, mostly in combination with a number of other additions.

The amount of iron compounds in such glass compositions in general is less than 2, more in particular less than 1 wt. % of the glass composition.

The transmission of UV radiation in such glass compositions is still high, because otherwise the transmission of the visible light is too much inhibited. For this reason the transmission at 380 and 400 nm is still at a level that makes the glass composition unsuitable for use as packing glass for foods and beverages sensitive to UV radiation.

On the other hand, the problem occurs that the transmission for visible light must be maintained at least partially, because the consumer/user must be able to see the contents of the packing. Also, the wish to obtain a specific color can at least partially be contrary to the objective of the absorption of UV radiation.

It is an object of the invention to provide a packing for foods and/or beverages sensitive to UV radiation, which packing is based on chromium-free and preferably also nickel-free green soda-lime glass. More in particular, it is an object of the invention to provide a packing in which the transmission of radiation having a wavelength of <400 nm and more in particular also of 380 nm, at a glass thickness of 2 mm, is nil or negligible, while at least part of the transmission of visible light is retained.

The invention is based on the surprising insight that such objects can be achieved by using a relatively large amount of iron in soda-lime glass. The invention therefore relates to a packing for foods on the basis of green-colored soda-lime glass absorbing UV radiation and transmitting visible light, which glass consists of:

at least 2.5 wt. % iron, calculated as $Fe_2O_3$,
at least 12 wt. % sodium, calculated as $Na_2O$, and
at most 4 wt. % aluminium, calculated as $Al_2O_3$.

Surprisingly, it has been found that such a packing satisfies the requirements imposed on the UV absorption at 380 and 400 nm, while yet a good green color is obtained which, moreover, can be adjusted by selecting the conditions during melting, as well as by selecting the other components of the glass batch.

Also, the degree of absorption at the stated wavelengths is adjustable by these selections, in which connection it should be considered that the total amount of iron and the ratio of Fe(II) to Fe(III) in the final glass are of great importance to obtaining the correct properties with regard to color and UV absorption, or transmission of visible light. Preferably, the ratio $$\frac{Fe(II)}{Fe(II) + Fe(III)}$$

in the glass does not exceed 0.25.

To obtain the correct properties of the glass, this ratio between divalent iron and trivalent iron is of great importance. This ratio is expressed as $$\frac{Fe(II)}{Fe(II) + Fe(III)},$$

i.e. the amount of divalent iron in relation to the total of iron. Preferably, the amount of divalent is as small as possible, i.e. less than 0.15.

In practice, values less than 0.05 are hard to realize. The total amount of iron should not be less than about 2.5 wt. %, calculated as $Fe_2O_3$, because otherwise its effect is not reached to a sufficient degree. On the other hand, it is not necessary to use more than about 12 wt. %, calculated as $Fe_2O_3$. At this concentration the glass, at a thickness of 2 mm, does not or practically does not transmit visible light any more.

In the following table the transmission (T) at 380 and 400 nm is shown as a function of the iron content, measured on soda-lime glass having a thickness of 2 mm.

| Wt. % Fe | % $T_{380}$ | % $T_{400}$ |
|---|---|---|
| 2 | 25 | 54 |
| 3.5 | 5 | 22 |
| 5 | 0 | 5 |
| 6.5 | 0 | 2 |
| 8 | 0 | 0 |

It is observed that in J. of the Society of Glass Technology, 22, (1938), pages 372–389, a theoretical consideration is given to the equilibrium between Fe(II) and Fe(III). In this article amounts of 0.002 to 12.50 wt. % iron, calculated as $Fe_2O_3$, in soda-lime glass are examined. This publication gives no indication of the properties of the glass with regard to UV absorption or with regard to the use of such glass for packing purposes.

The adjustment of the color of the glass may also be effected by selecting the redox value of the starting materials. This redox value partly determines the Fe(II)/Fe(III) equilibrium, so that the color can be adjusted by adding components affecting this value. Suitable additions are known to those skilled in the art. In this connection it may be observed that cullet, provided it be substantially free from the undesirable heavy metals, can be used as raw material. However, the presence of paper and other organic impurities may affect the Fe(II)/Fe(III) ratio and therefore move the color in an undesirable direction.

The packing according to the invention is, on the one hand, characterized by the transmission for radiation of 380 nm at a glass thickness of 2 mm being <5%, more in particular <1%, and at 400 nm <20%, more in particular <5% and most preferably <1%, which, in practice, means that the packing absorbs the UV radiation completely or nearly completely, while, on the other hand, the visible light is largely transmitted and the color of the glass is green. The latter means that the dominant wavelength of the glass is readily in the vicinity of 500 to 565 nm. Of course, it is also possible to define the color on the basis of the CIE-Lab system. Starting from a measurement on transparent colored glass having a thickness of 2 mm, against a white background with $L^*=98.89$, $a^*=-0.06$ and $b^*=0.02$, with D65 light at an observation angle of 2°, with a BYK-Gardner spectrometer, type Spectrogard Automatch Color System TCM 8800, under standard CIE-lab conditions the color is to be defined as follows:

$L^*=0–80$, $a^*=0--35$ en $b^*=-10-+55$.

The packing according to the invention is based on soda-lime glass, which has the advantage that its costs remain low. This can in particular be of importance for glass that is used only once and is then recycled again. The components of such soda-lime glass compositions are known to those skilled in the art.

According to the invention substantially no chromium, vanadium, nickel and cobalt is used; as already indicated, this is important from considerations both of costs and of environment. Certainly when the packing should be suitable for single use, the absence of such metals is of great importance. Also, the glass should not contain arsenic and tin, since these substances are undesirable in the glass because of their environmental effects. In this respect it is observed that although in connection with the present invention reference is made to the use of metals, yet these metals will be contained in the final glass in the form of compounds thereof, in particular oxides.

In general, it is preferred that the glass consists of 2.5 –10 wt. % iron, calculated as $Fe_2O_3$ 50–82.5 wt. % $SiO_2$ 12–25 wt. % alkali metal oxide 2.5–25 wt. % alkaline earth metal oxide 0–4 wt. % aluminium oxide 0–5 wt. % traces.

The amount of iron preferably ranges from 2.75 to 8 wt. %. As trace components different additions can be used which affect the properties (color, Fe(II)/Fe(III) ratio, melting properties and the like). Examples of such components are manganese and titanium.

The content of sodium should be at least 12 wt. %, because at decreasing contents the processability is increasingly unsatisfactory owing to the increasing viscosity. The aluminium content should not exceed 4 wt. %. Above this value a marked increase of the viscosity occurs, which has the result that under conventional conditions the glass can-not be made into an acceptable product anymore. It is observed that addition of an amount of lava, as described in JP-A 1/5044, leading to an iron content of at least 2.5 wt. %, gives an aluminium content of about 4.5 wt. % and a sodium content of about 10 wt. %.

The packing according to the invention is manufactured in the manner conventional for the manufacture of glass, by melting the components in a furnace under such conditions that the desired degree of oxidation of the iron is reached. According to the present invention the degree of air supply during melting turns out to be important. By controlling this, the ratio of di- and trivalent iron can be partly influenced.

The packing is suitable for contact with foods and beverages, such as soft drinks, alcoholic drinks and fruit juices. More in particular, the packing is suitable as beer bottle, since beer has the property of seriously deteriorating when being exposed to UV radiation.

The invention will be explained by means of the following examples.

EXAMPLES

Soda-lime glass was made by melting in the air at a temperature of 1450° C. The composition of the batch was in wt.parts:

74.5 parts sand 24.5 parts sodium carbonate 0.5 parts sodium sulfate 20.0 parts calcium carbonate 3.1 parts aluminium hydroxid iron as $Fe_2O_3$ in variable amounts.

This leads to the following basis glass composition:

| | |
|---|---|
| $SiO_2$ | 73 wt. % |
| $Na_2O$ | 14 wt. % |
| CaO | 11 wt. % |
| $Al_2O_3$ | 2 wt. % |
| $Fe_2O_3$ | in variable amounts. |

In the following table the transmission (T) at 380, 400, 500 and 600 nm, as well as the color, given as a function of the amount of iron.

| % $Fe_2O_3$ | % $T_{380}$ | % $T_{400}$ | % $T_{500}$ | % $T_{600}$ | $L^*$ | $a^*$ | $b^*$ |
|---|---|---|---|---|---|---|---|
| 2 | 25 | 54 | 73 | 72 | 79 | −13 | 13 |
| 3.5 | 5 | 22 | 81 | 52 | 59 | −15 | 25 |
| 5 | 0 | 5 | 30 | 35 | 39 | −11 | 31 |
| 6.5 | 0 | 2 | 14 | 20 | 20 | −4.5 | 25 |
| 8 | 0 | 0 | 5 | 10 | 6,3 | −0.2 | 8.3 |

What is claimed is:

1. A beverage bottle comprising a green colored soda-lime glass capable absorbing UV radiation and transmitting visible light, said glass comprising 2.5–10 wt. % iron, calculated as $Fe_2O_3$, 50–82.5 wt. % $SiO_2$, 12–25 wt. % alkali metal oxide, 3–25 wt. % alkaline earth metal oxide, 0–4 wt. % aluminum oxide, 0–5 wt. % traces, whereby the glass contains at least 12 wt. % sodium, calculated as $Na_2O$ and has an ion ratio $$\frac{Fe(II)}{Fe(II)+Fe(III)}$$

of at least 0.05, but not exceeding 0.25, and wherein at least a portion of said alkaline earth metal oxide is calcium oxide, said green colored glass having its dominant transmission wavelength in the range of 500 to 565 nm.

2. A beverage bottle according to claim 1 wherein the ratio $$\frac{Fe(II)}{Fe(II)+Fe(III)}$$

does not exceed 0.15.

3. A beverage bottle according to claim 1, wherein the transmission of the glass for radiation of 380 nm at a thickness of 2 mm is <5%.

4. A beverage bottle according to claim 1, wherein the transmission of the glass for radiation of 380 nm at a thickness of 2 mm is <1%.

5. A beverage bottle according to claim 1, wherein the transmission of the glass for radiation of 400 nm at a thickness of 2 mm is <20%.

6. A beverage bottle according to claim 1, wherein the transmission of the glass for radiation of 400 nm at a thickness of 2 mm is <5%.

7. A beverage bottle according to claim 1, wherein the content of iron, calculated as $Fe_2O_3$, exceeds 2.75 wt. %, but does not exceed 8 wt. %.

8. A beverage bottle according to claim 1, wherein the glass substantially contains no chromium, nickel, cobalt, vanadium, arsenic and tin.

9. A beverage bottle according to claim 2, wherein the transmission of the glass for radiation of 380 nm at a thickness of 2 mm is <5%.

10. A beverage bottle according to claim 2, wherein the transmission of the glass for radiation of 380 nm at a thickness of 2 mm is <1%.

11. A beverage bottle according to claim 2, wherein the transmission of the glass for radiation of 400 nm at a thickness of 2 mm is <20%.

12. A beverage bottle according to claim 2, wherein the transmission of the glass for radiation of 400 nm at a thickness of 2 mm is <5%.

13. A beverage bottle according to claim 3, wherein the transmission of the glass for radiation of 400 nm at a thickness of 2 mm is <20%.

14. A beverage bottle according to claim 2, wherein the transmission of the glass for radiation of 400 nm at a thickness of 2 mm is <5%.

15. A beverage bottle according to claim 1, wherein said beverage bottle is a beer bottle.

16. A beverage bottle according to claim 2, wherein said beverage bottle is a beer bottle.

17. A beverage bottle according to claim 3, wherein said beverage bottle is a beer bottle.

18. A beverage bottle according to claim 4, wherein said beverage bottle is a beer bottle.

19. A beverage bottle according to claim 8, wherein said beverage bottle is a beer bottle.

* * * * *

UNITED STATES PATENT AND TRADEMARK OFFICE
CERTIFICATE OF CORRECTION

PATENT NO. : 5,912,199
DATED : June 15, 1999
INVENTOR(S) : Adrianus Smout, et al.

It is certified that error appears in the above-identified patent and that said Letters Patent is hereby corrected as shown below:

On the title page, other publications, line 3 "77 103 311" should be --77 102 311--.

Col. 1, line 25 "Compounds" should be --compounds--.

Col. 1, line 37 "TV" should be --UV--.

Col. 4, line 3 "JP-A 1/5044," should be --JP-A 1/65044,--.

Col. 4, line 32 "hydroxid" should be --hydroxide--.

Claim 1, line 2 after "capable" insert --of--.

Claim 14, line 1 "2" should be --4--.

Signed and Sealed this

Twenty-first Day of December, 1999

Q. TODD DICKINSON

Attest:

Attesting Officer

Acting Commissioner of Patents and Trademarks